US012596809B2

(12) United States Patent  (10) Patent No.: US 12,596,809 B2
Aharon-Nov  (45) Date of Patent: Apr. 7, 2026

(54) METHOD FOR DETECTING VULNERABILITIES OF TARGET APPLICATIONS, DEVICE, AND MEDIUM THEREOF

(71) Applicant: RMOUR LLC, New York, NY (US)

(72) Inventor: Nadav Aharon-Nov, New York, NY (US)

(73) Assignee: RMOUR LLC, New York, NY (US)

( * ) Notice: Subject to any disclaimer, the term of this patent is extended or adjusted under 35 U.S.C. 154(b) by 108 days.

(21) Appl. No.: 18/443,279

(22) Filed: Feb. 15, 2024

(65) Prior Publication Data

US 2024/0296233 A1    Sep. 5, 2024

Related U.S. Application Data

(60) Provisional application No. 63/449,535, filed on Mar. 2, 2023.

(51) Int. Cl.
G06F 21/57 (2013.01)
(52) U.S. Cl.
CPC ................................. G06F 21/577 (2013.01)
(58) Field of Classification Search
CPC ...................................................... G06F 21/577
See application file for complete search history.

(56) References Cited

U.S. PATENT DOCUMENTS

2024/0126899 A1* 4/2024 Yang ........................ G06F 21/62
2024/0211599 A1* 6/2024 Koo ........................ G06F 21/554

* cited by examiner

*Primary Examiner* — Sangseok Park
(74) *Attorney, Agent, or Firm* — Arch & Lake LLP; Hao Tan; Shen Wang

(57) ABSTRACT

A method for obtaining target data items from a target application to determine vulnerabilities of the target application is provided. The method includes obtaining a plurality of first data items from the target application; analyzing the plurality of first data items to obtain relevancies for the plurality of first data items; when the relevancies satisfy a first condition, automatically scanning the target application at first pre-determined times to obtain a plurality of first target data items associated with the input data; when relevancies satisfy a second condition, selecting one or more second data items from the plurality of first data items, and scanning the target application at second pre-determined times to obtain a plurality of second target data items associated with input data; obtaining target data items associated with the target application and determining whether the target application is vulnerable based on the target data items that are obtained.

20 Claims, 10 Drawing Sheets

Assets 300

| Subdomains | | | | | ⤓ |
|---|---|---|---|---|---|

Home • Assets • Subdomains                                    Search all columns...

| Sub-Domain ⬍ | IP ⬍ | Port ⬍ | Location ⬍ | Status ⬍ |
|---|---|---|---|---|
| | 40.88.201.10 | 80,443 | Ashburn,Virginia | Active |
| | 3.139.173.8 | | Columbus,Ohio | Active |
| | 40.127.143.145 | | Dublin,Leinster | Active |
| | 40.88.201.10 | | Ashburn,Virginia | Active |
| | 40.88.201.10 | | Ashburn,Virginia | Active |
| | 40.88.201.10 | 80,81,443,444,8000,8080,8081,8443,8888 | Ashburn,Virginia | Active |
| | 40.127.143.145 | | Dublin,Leinster | Active |
| | 40.88.201.10 | 80,443 | Ashburn,Virginia | Active |
| | 40.88.201.10 | 443 | Ashburn,Virginia | Active |
| | 40.88.201.10 | 80,443 | Ashburn,Virginia | Active |

‹ 1 2 3 4 5 ··· 16 ›

People 400

METHOD FOR DETECTING VULNERABILITIES OF TARGET APPLICATIONS, DEVICE, AND MEDIUM THEREOF

CROSS-REFERENCE TO RELATED APPLICATIONS

This application is based upon and claims priority to Provisional Application No. 63/449,535 filed on Mar. 2, 2023, the entire disclosures of which are incorporated herein by reference in their entireties for all purposes.

TECHNICAL FIELD

The present disclosure generally relates to the field of data processing system, and more specifically, to methods and devices on determining vulnerabilities of target applications or target data.

BACKGROUND

Internet resources associated with an entity are valuable but vulnerable to be attacked. In order to better protect the internet resources associated with the entity, such as an enterprise, an organization, a business, an individual, etc., there is an urgent need to monitor the digital or internet presence of various resources associated with the entity so as to evaluate and manage these resources or assets.

It has been widely discovered that vulnerabilities are undermining an entity's software, hardware, and/or firmware. There is also an urgent need for an integrated platform which can obtain and report all the vulnerabilities to the entity for mitigation.

SUMMARY

According to a first aspect of the present disclosure, a method for obtaining target data items from a target application to determine vulnerabilities of the target application is provided. The method may include that a monitoring system obtains a plurality of first data items from the target application according to an input data corresponding to at least one first category and stores the plurality of first data items in one or more storages, where the plurality of first data items correspond to at least one second category. Additionally, the method may include a relevancy determinator in the monitoring system analyzes the plurality of first data items to obtain one or more relevancies for the plurality of first data items, where the one or more relevancies are associated with the input data. Furthermore, the method may include a scanning engine in the monitoring system automatically scans, according to the plurality of first data items, the target application at first pre-determined times to obtain a plurality of first target data items associated with the input data in response to determining that the one or more relevancies satisfy a first condition, where the plurality of first target data items correspond to the at least one second category.

Moreover, the method may include in response to determining that the one or more relevancies satisfy a second condition, selecting one or more second data items from the plurality of first data items and the scanning engine scans, according to the one or more second data items, the target application at second pre-determined times to obtain a plurality of second target data items associated with the input data. Furthermore, the method may include that the monitoring system obtains a plurality of target data items associated with the target application, where the plurality of target data items comprise the plurality of first target data items and the plurality of second target items; and determines whether the target application is vulnerable based on the plurality of target data items that are obtained.

According to a second aspect of the present disclosure, a device is provided. The device may include one or more processors, a non-transitory storage coupled to the one or more processors, and a plurality of programs stored in the non-transitory storage that, when executed by the one or more processors, cause the device to perform acts according to the first aspect.

According to a third aspect of the present disclosure, a non-transitory computer readable storage medium is provided. The non-transitory computer readable storage medium stores a plurality of programs for execution by a device having one or more processors, wherein the plurality of programs, when executed by the one or more processors, cause the device to perform acts according to the first aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
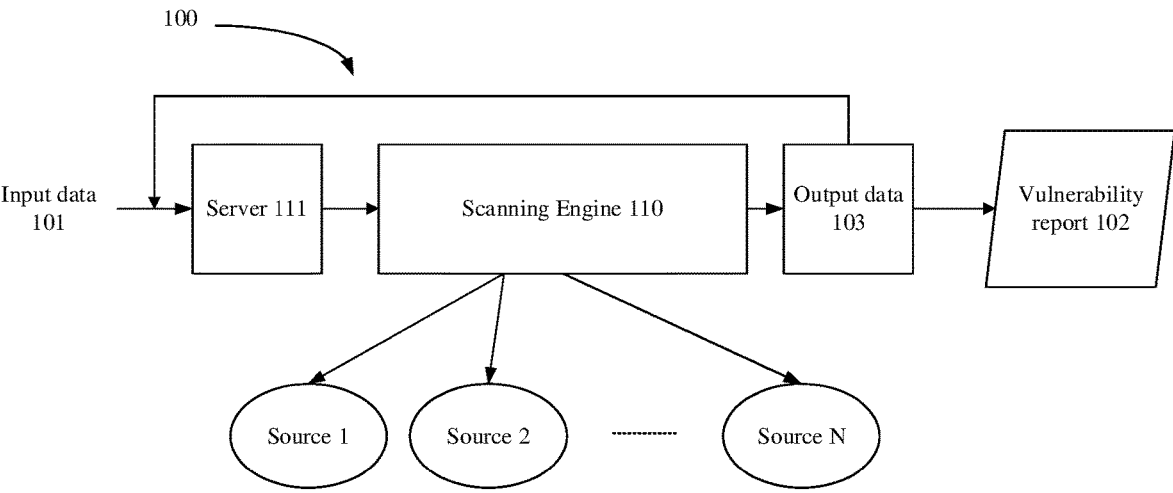
FIG. 1 is a block diagram illustrating an example overview of a monitoring system in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an example overview of a monitoring system in accordance with some implementations of the present disclosure. The monitoring system may be executed using one or more processors located in one or more servers or one or more cloud servers, among various other implementation options. As shown in FIG. 1, the monitoring system 100 may include a server 111 that receives an input data 101 and generate a vulnerability report 102. The monitoring system 100 may include a scanning engine 110 which may obtain or access various internet resources (e.g., IT resources regardless of public or private) associated with the input data 101. Additionally, the monitoring system 100 may include a relevancy determinator that determines the relevancy between the various internet resources obtained by the scanning engine 110. The vulnerability report 102 may be generated based on the various internet resources obtained by the scanning engine 110 and the relevancy determined by the relevancy determinator.

In some examples, the input data 101 may include an input query inputted by a user through an input interface of an integrated platform, such as a web browser, an application, or other equivalent sources. The user may be one entity, such as an enterprise, an organization, a business, an individual, etc. The input query may belong to one of multiple categories. The scanning engine 110, after receiving the input query, may scan a plurality of sources over internet (e.g., open source materials) to obtain one or more output data 103. The one or more output data 103 may associated with one or more categories that are same or different from the category that the input query belongs to.

In some examples, as shown in Table 1, when the user inputs an input query which is a domain name, the scanning engine 110 may scan one or more sources as listed in the column of "Action Name" in Table 1. For example, Source 1, Source 3, Source 4, Source 5, Source 9, Source 13-16, Source 25-27, Source 29, Source 31 and/or Source 35 may be selectively or automatically scanned so that the output data 103 associated with the input query may be generated by the scanning engine 110. The output data 103 may belong to a variety of categories including domains, subdomains, emails, ports, location, ips, Secure Sockets Layer (SSL) certificate, vulnerabilities, etc., as shown in the column of "Outputs" in Table 1 below. The input data 101 may belong to a variety of categories including domain, subdomain, url, email, etc. as shown in the column of "Inputs" in Table 1. The input data 101 and the output data 103 are not limited to the examples shown in Table 1. Thus, the categories to which the input data 101 belongs and the categories to which the output data 103 belongs may be same, different, or some overlap. Additionally, the number of sources are not limited to Table 1.

The column of "Action Name" in Table 1 lists a plurality of sources in which the scanning engine 110 may scan. The plurality of sources may include all possible sources that related to the input data 101 and/or the output data 103. For example, a resource may receive an input query which may be a domain name, a subdomain name, IP address, URL, etc.

After receiving the input query, the source, such as a domain lookup API, may output the output data 103 which may be other domain/subdomain, port, person, social, email, phone, and/or image. Furthermore, after determining whether the output data 103 is relevant to the user's query, the output data 103 may be further used as another input query for next round of scanning in other resources. For example, when a first input query is a domain and after scanning Source 3 in Table 1 in which domain is an input, one or more first output data, the output data 103 obtained in this round of scanning, may be obtained. The one or more first output data may be emails related to the first input query. Furthermore, the one or more first output data may be used as an input query in Source 11 where email is an input. After scanning Source 11, other output data including person, phone, email and/or social may be obtained. Accordingly, more rounds of scanning may be performed by using the output data from the previous scanning as the input data for the next scanning.

TABLE 1

| Action Name | Inputs | Outputs | Groups |
|---|---|---|---|
| Source 1 | domain | domains/subdomains | Basic Recon |
| Source 2 | url | domains/subdomains | Basic Recon |
| Source 3 | domain, subdomain | emails | Basic Recon |
| Source 4 | domain, subdomain, ips | ports | Basic Recon |
| Source 5 | domain, subdomain, ips | Operating system - Raw data | Basic Recon |
| Source 6 | Text search | Repos - Raw data | Git |
| Source 7 | Text search | Repos - Raw data | Git |
| Source 8 | email | breach, paste | People |
| Source 9 | domain | person, social, email, phone, image | People |
| Source 10 | Shodan specific query | location, ips, domains, ports | Basic Recon |
| Source 11 | email | person, phone, email, social | People |
| Source 12 | url | vulnerabilities | Vuls |
| Source 13 | domain | ssl certificate | Basic Recon |
| Source 14 | domain | subdomain | Basic Recon |
| Source 15 | domain | subdomain, domain, ips, emails | Basic Recon |
| Source 16 | domain | domains, subdomains | Basic Recon |
| Source 17 | url | vulnerabilities | Vuls |
| Source 18 | url | firewall | Basic Recon |
| Source 19 | url | vulnerabilities | Vuls |
| Source 20 | Xforce special query | Vulnerabilities, ips | Vuls |
| Source 21 | domain:port | Vulnerabilities | Vuls |
| Source 22 | domain | person, social, email, image | People |
| Source 23 | domain | location, ips, ports | Basic Recon |
| Source 24 | url | raw data | Basic Recon |
| Source 25 | url, domain | Vulnerabilities | Vuls |
| Source 26 | url, domain, ip | vulnerabilities | Vuls |
| Source 27 | domain, subdomain | Technology, cms users | Basic Recon |
| Source 28 | ip | url | Basic Recon |
| Source 29 | domain | domain, product, ip, email | Advace Recon |
| Source 30 | free text | onion links | Advace Recon |
| Source 31 | domain, subdomain, ips | url | Advace Recon |
| Source 32 | company alias, product | mobile apps | Advace Recon |
| Source 33 | company alias, product | mobile apps | Advace Recon |
| Source 34 | company alias, product | mobile apps | Advace Recon |
| Source 35 | domain, subdomain, ips | url | Advace Recon |
| Source 36 | url | emails | Advace Recon |
| Source 37 | | SQL Vulnerabilities | Vuls |
| Source 38 | | Vulnerability | Vuls |
| Source 39 | | Vulnerabilities | Vuls |
| Source 40 | | vulnerability | Vuls |
| Source 41 | | cracking passwords | Basic Recon |
| Source 42 | | creation of print screen for evidence | Basic Recon |

In some examples, relevancy is used to determine whether the output data 103 is relevant to the user's input query. When the output data 103 is relevant to the user's input query, the relevancy may be set as high. When the output data 103 is not relevant to the user's input query, the relevancy may be set as low. In some examples, a value of the relevancy may be used. For example, when the output data 103 include data items same as the input data 101, the value of relevancy may be determined as 100%. When the output data 103 include data items partially equivalent as the input data 101, the value of relevancy may be determined as N %, where N % indicates a certain degree that the data items match the input data 101.

When the value is higher than a threshold value, it is determined that the output data 103 is relevant to the user's input query. Otherwise, when the value is less than the threshold value, it is determined that the output data 103 is not relevant to the user's input query. In some examples, an Artificial Intelligent (AI) system may be used to determine the relevancy. For example, a trained neural network may be used to determine whether the output data 103 is related to the input data as a ground truth. The neural network may be trained using data in the categories of the input data 101 and/or the output data 103.

In one example, different rounds of scanning may be performed automatically. In yet another example, a next round scanning may be performed based on some conditions. For examples, when the relevancy of the output data 103 obtained from the current scanning satisfy a condition, e.g., less than a threshold vale, the output data 103 in one or more selected categories may be used in the next round or next few rounds of scanning in other sources. The number of scanning rounds may be pre-defined.

Figure 2:
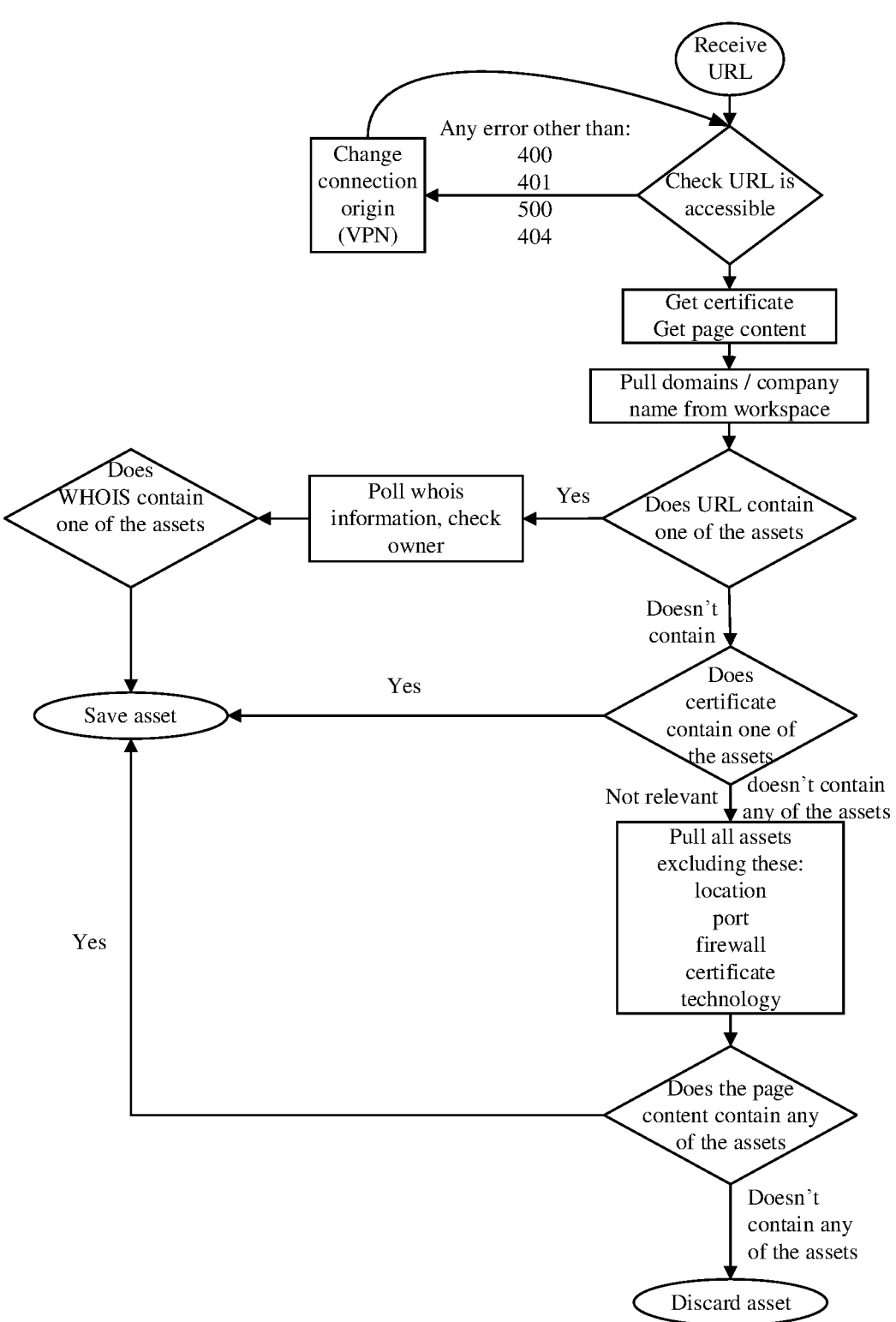
FIG. 2 is a flow chart showing a method in accordance with some implementations of the present disclosure.

In some examples, based on the output data 103, it is further monitored or checked whether the output data 103 belonging to the one or more categories is accessible. When the output data 103 is not accessible, there will be different errors occurred due to different reasons. For example, when the output data 103 is a URL displaying an error code other than 400, 401, 500, 404, a change of connection origin may be performed to further access the URL to check if the output data 103 is accessible to further determine that whether the output data 103 is relevant to the input query, as shown in FIG. 2. Here, the error code may include Hyper-Text Transfer Protocol (HTTP) 400 Bad Request response status code which indicates that the server cannot or will not process the request due to something that is perceived to be a client error. The error code may also include HTTP 401 Unauthorized response status code which indicates that the client request has not been completed because it lacks valid authentication credentials for the requested resource. Further, the error code may include HTTP 500 Internal Server Error server error response code which indicates that the server encountered an unexpected condition that prevented it from fulfilling the request. Moreover, the error code may include HTTP 404 Not Found response status code which indicates that the server cannot find the requested resource. The error code is not limited to the four examples provided above.

In some examples, the change of connection origin may be performed in different ways, e.g., by using a Virtual Private Network (VPN). After changing the connection origin, the output data 103 is checked again to determine whether the output data 103 is accessible. If it is not, change of connected may be repeatedly performed using different ways and by changing to different origins. If it is accessible, the output data 103 may be further monitored and processed to determine whether the output data 103 contain any assets that the user is looking for or are related to the user. The related assets may be ownership information, IP address history, Search engine optimization (SEO), etc. that belong to the user or related to the user.

In some examples, in the scenario that the output data 103 is a URL which indicating an accessible webpage, certificate and page content are further obtained from the webpage. Based on the information related to the user and associated with the input data, such as domains, company name, company information, etc., it is determined whether the URL in the output data 103 contain any assets that the user is looking for or are related to the user. If yes, further information about the URL may be obtained to check the owner of the URL. For example, WHOIS information, an Internet record listing (e.g., ownership information, IP address history, SEO) that identifies who owns a domain and how to get in contact with them, may be obtained to check whether the WHOIS information contains any assets. If yes, the asset/s contained in the WHOIS information may be saved as one of basics to generate the vulnerability report 102.

In some examples, it is further determined whether the certificate obtained from the webpage contain any assets. If yes, the asset/s may be saved as one of basics to generate the vulnerability report 102. Furthermore, if the certificate does not contain any assets, all other information related to the output data 103 may be obtained to check. In some examples, information such as port, firewall, etc. may not be used or obtained for the further check. If after all these checking steps, no asset is found from the output data 103, it is determined that the output data 103 will be discarded and/or not to be used to generate the vulnerability report 102.

In some examples, the relevancy may be used to determine whether the output data 103 contain any assets that the user is looking for or are related to the user. For example, when it is determined that the WHOIS information indicates that the owner is the user, it is determined that the output data 103, i.e., the URL, is relevant to the user.

Figures 3A, 3B:
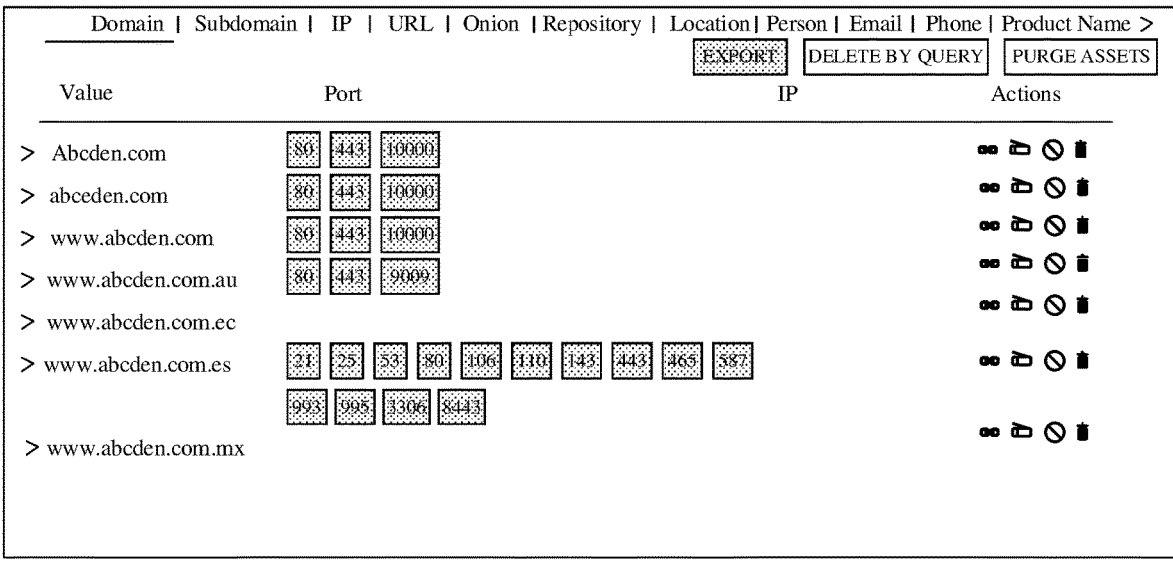
FIGS. 3A and 3B illustrate examples of UI interface showing assets 300 obtained in the category of domain in accordance with some implementations of the present disclosure.

FIG. 3A illustrates an example of UI interface showing assets 300 obtained in the category of domain in accordance with some implementations of the present disclosure. As shown in FIG. 3A, based on the user's input data 101 including the URL (e.g., Abcden.com), the domain (e.g., Abcden.com) and/or the product name (e.g., Abcden), the scanning engine 110 may scan from a plurality of sources selected from the examples shown in Table 1 and obtain a plurality of output data 103 belong to various categories including domain, subdomain, IP, URL, Onion, Repository, Location, Person, Email, Phone, Product Name, etc., as shown in FIG. 3A. FIG. 3A lists a list of output data 103 of domain that is related to the input data 102, as shown under "Value." Corresponding ports information are also listed. The layout of the interface showing the output data 103 and/or assets 300 are not limited to the example shown in FIG. 3A only. FIG. 3B illustrate another example of UI interface showing assets 300 obtained in the category of domain in accordance with some implementations of the present disclosure.

As shown in FIG. 3A, seven different domain values that are relevant to the input data 102 are obtained and listed. Based on the seven domain values, it is further determined whether these seven domain related pages are accessible as described in FIG. 2. When any of these domain related pages are not accessible, change of connection origin may be performed to re-check or re-test whether these domain related pages are accessible at a different connection origin.

Figure 4A:
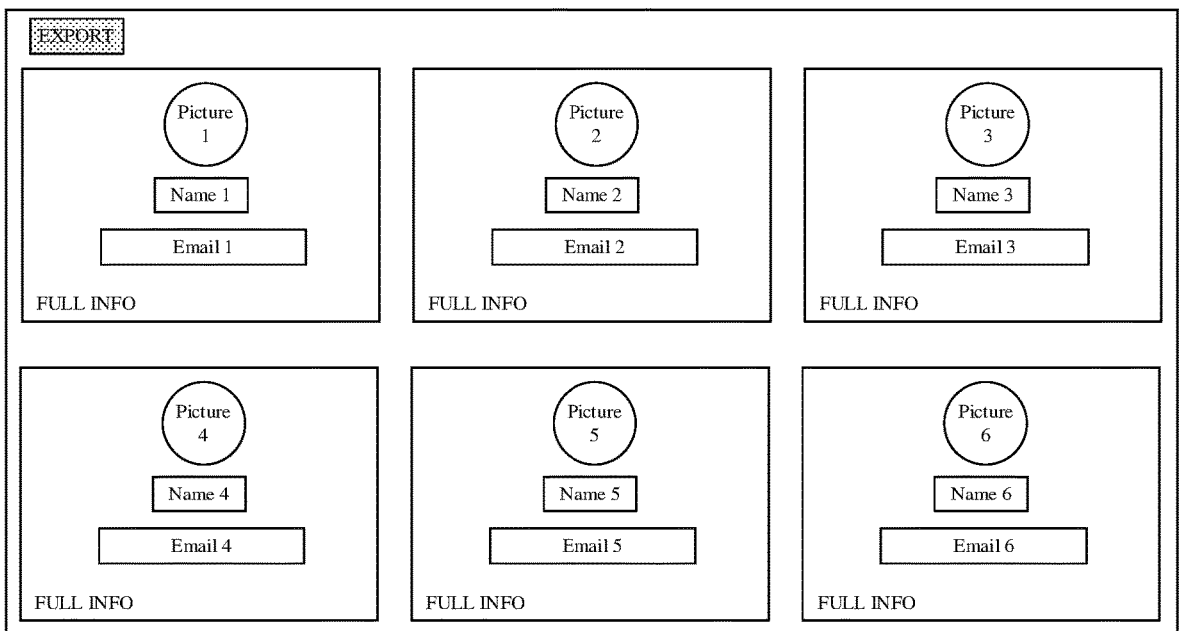
FIGS. 4A and 4B illustrate examples of UI interface showing the output data 103 obtained in the category of people 400 in accordance with some implementations of the present disclosure.

FIG. 4A illustrates an example of UI interface showing the output data 103 obtained in the category of people 400 in accordance with some implementations of the present disclosure. As shown in FIG. 4A, in some examples, the output data 103 has been obtained from some resources and belongs to some categories. For example, after scanning one or more sources where domain names may be obtained based on input data, such as viewDNS, one or more related domain names may be obtained. When accessing these domain related resources, such as webpages, information in other categories, such as email, text, social, image, person, phone, etc. may be obtained. In some examples, after determining the relevancy of the information in these other categories, more assets that are relevant to the user's inquiry may be identified. Based on these identified assets, other sources, such as social media applications, may be further scanned to obtain more relevant information and identify threats or vulnerability.

Figure 4B:
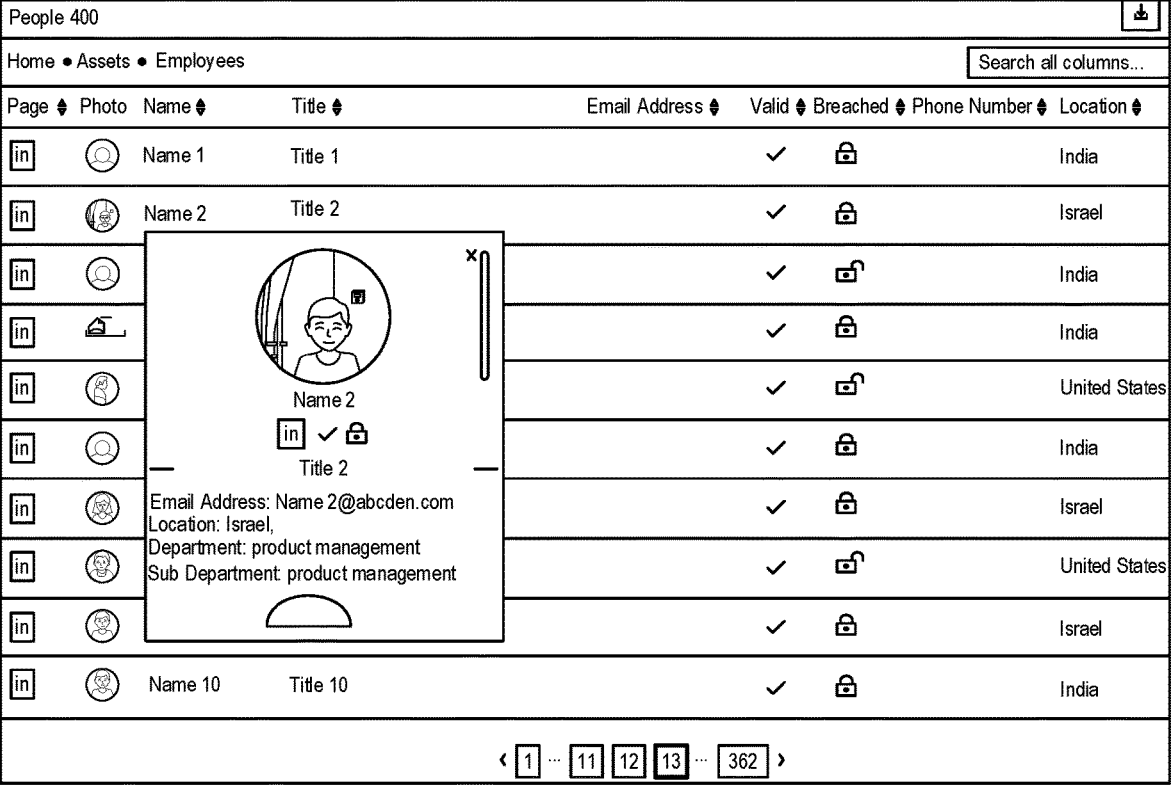

As shown in FIG. 4A, after identifying relevant emails, images, persons, names from the one or more domain related resources, information People 400 may be obtained by scanning a social media application in which people relevant to the query of the user may be listed as shown in FIG. 4A by illustrating picture, name, email and/or full information. These identified people may be, but not limited to, current or previous employees of the user, or relevant people as the user identifies. In some examples, when the information as shown in FIG. 4A is obtained when scanning other sources, vulnerability may be reported due to privacy or safety. For example, when scanning other sources, same emails as shown in FIG. 4A may be also found in other unexpected location. In this case, vulnerability may be reported. FIG. 4B illustrates another example of UI interface showing the output data 103 obtained in the category of people 400 in accordance with some implementations of the present disclosure.

Figure 5A:
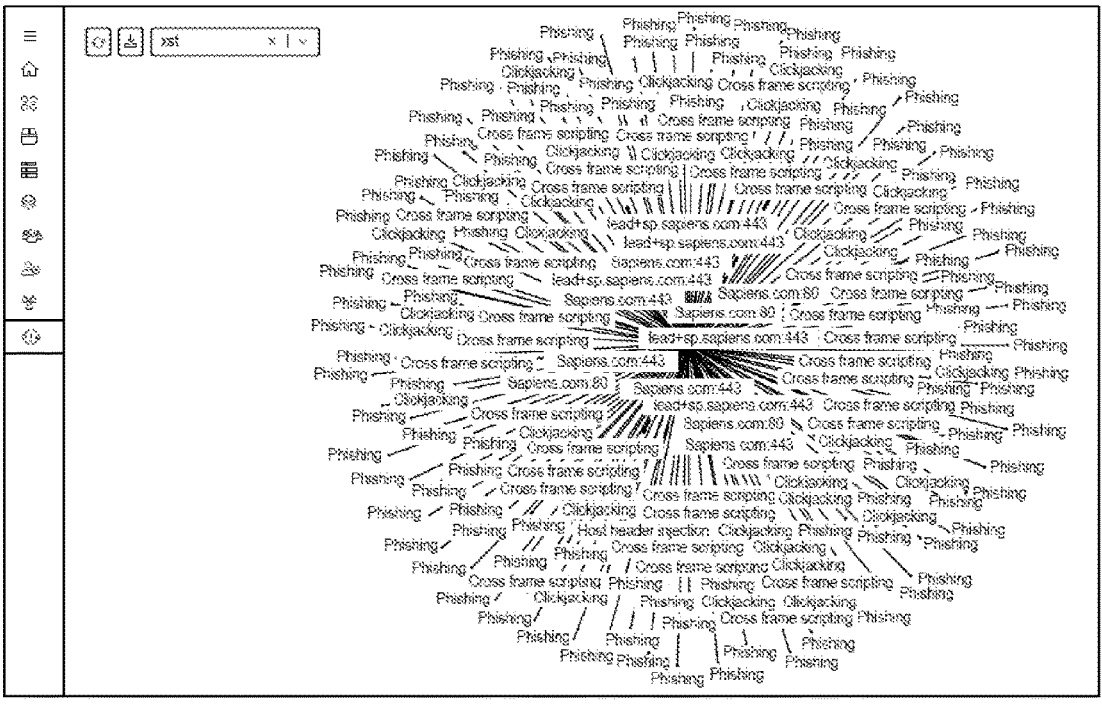
FIG. 5A is a statistic illustration of alerts obtained after scanning the plurality of sources in accordance with some implementations of the present disclosure.

FIG. 5A is a statistic illustration of alerts obtained after scanning the plurality of sources in accordance with some implementations of the present disclosure. As shown in FIG. 5A, different alerts may include phishing, cross frame scripting, clickjacking, etc.

Figure 5B:
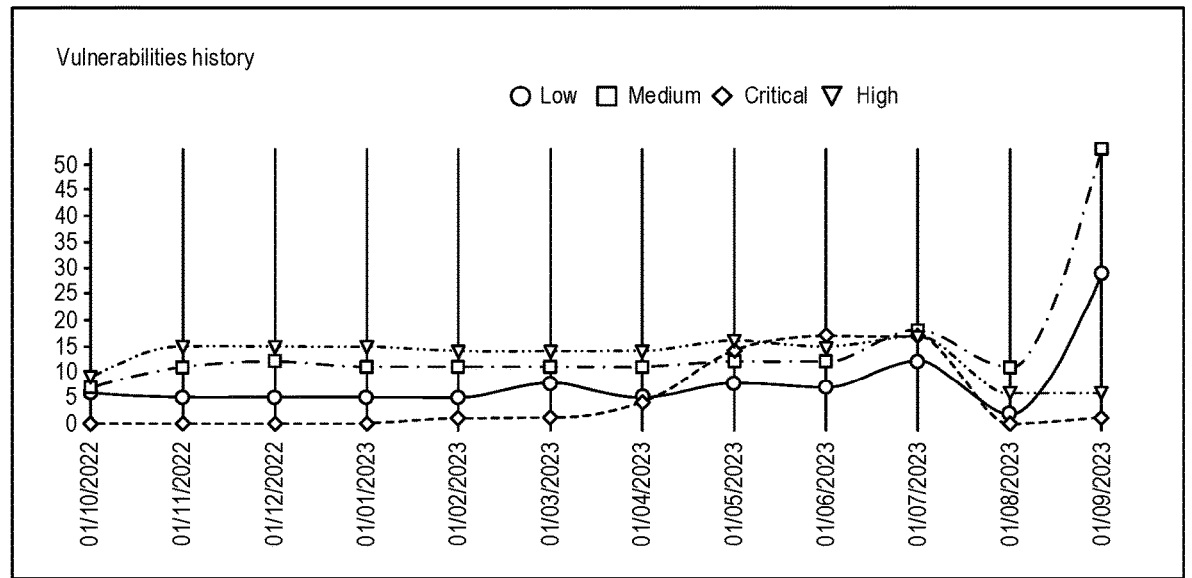
FIG. 5B is a statistic illustration of vulnerabilities history obtained after scanning the plurality of sources in accordance with some implementations of the present disclosure.

FIG. 5B is a statistic illustration of vulnerabilities history obtained after scanning the plurality of sources in accordance with some implementations of the present disclosure. As shown in FIG. 5B, different levels of vulnerabilities are shown with respect to time.

Figure 6A:
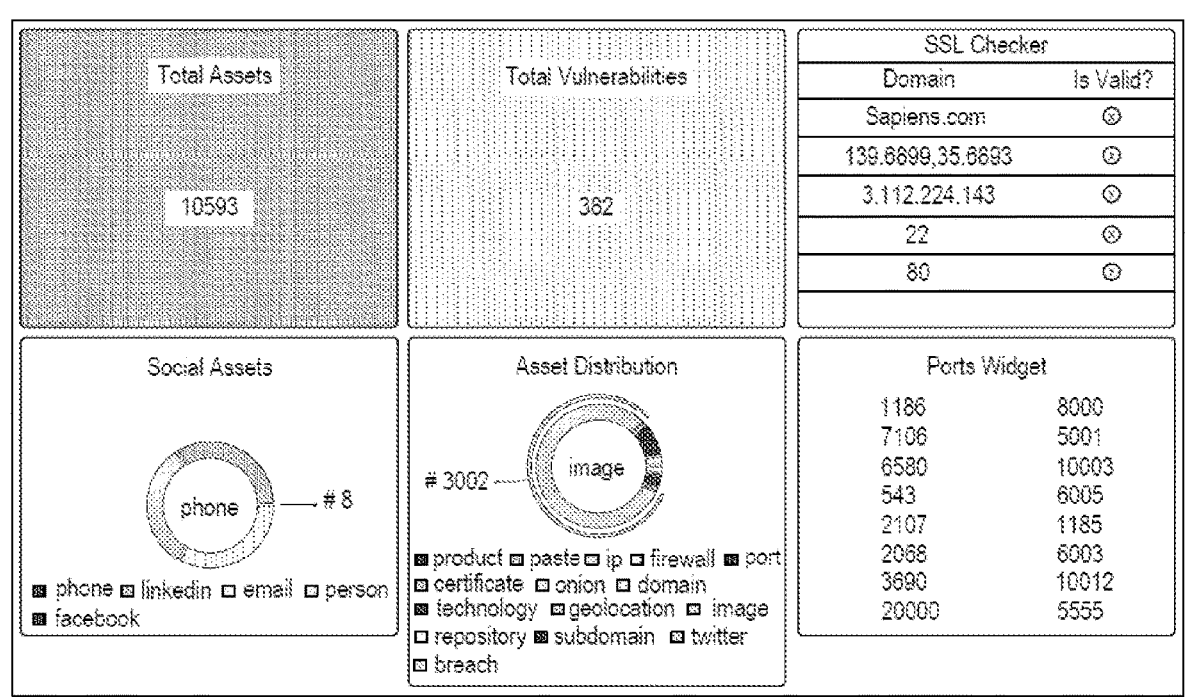
FIGS. 6A and 6B illustrate examples of an overview panel of results after scanning the plurality of sources based on the input query in accordance with some implementations of the present disclosure.
Figure 6B:
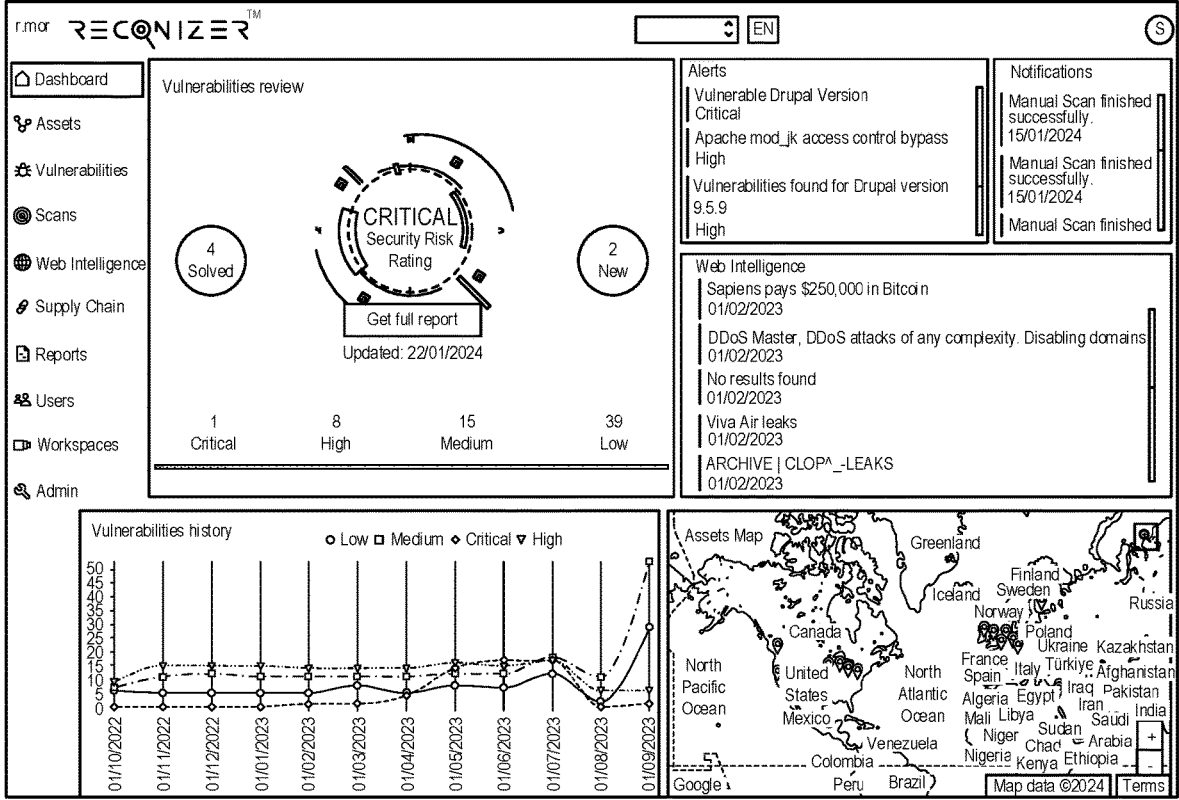

FIGS. 6A and 6B illustrate examples of an overview panel of results after scanning the plurality of sources based on the input query in accordance with some implementations of the present disclosure. As shown in FIGS. 6A and 6B, the overview panel lays out several relevant information after scanning the plurality of sources, such as the sources as listed in Table 1. The relevant information may include, but not limited to, total assets that have been scanned, total vulnerabilities that have been identified, social assets that have been identified from different sources, asset distribution, ports that are obtained, etc.

Figure 7A:
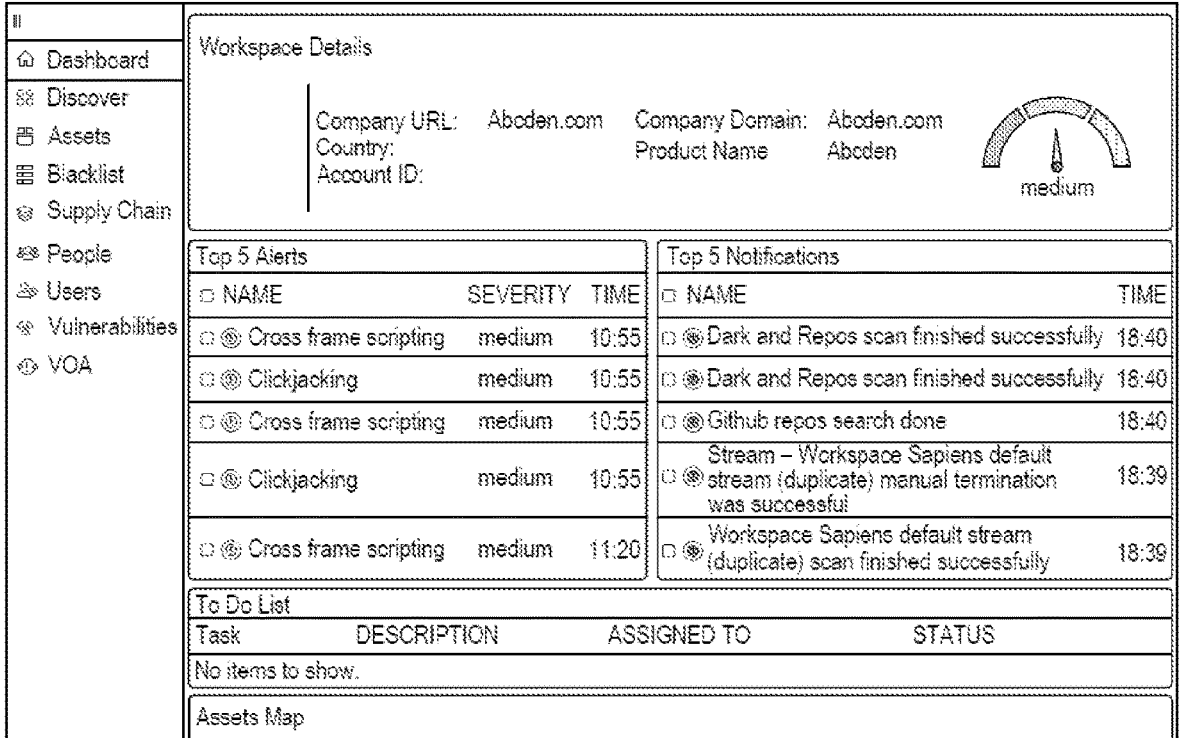
FIGS. 7A and 7B illustrate examples of workspace details in accordance with some implementations of the present disclosure.
Figure 7B:
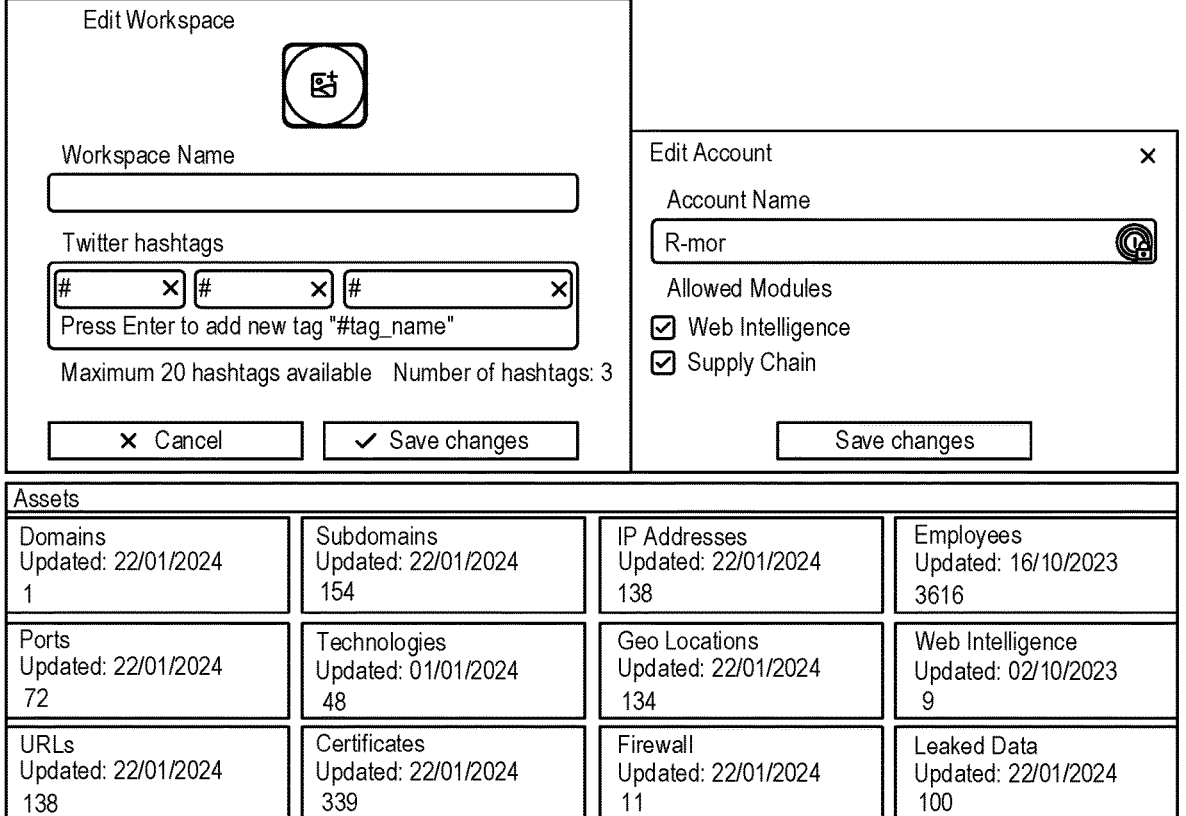

FIGS. 7A and 7B illustrate examples of workspace details in accordance with some implementations of the present disclosure. As shown in FIG. 7A, the input data 101 may be displayed. For example, the Company URL, Company Domain, and/or Product Name may be used as the input query. Additionally, notifications may be displayed to notify the user which source or sources have been scanned, which threats or vulnerabilities have been identified, etc. A vulnerability level or a threat level may be displayed. For example, in the example of FIG. 7A, the query is subject to a medium vulnerable level.

In some examples, a value of the total assets obtained by scanning the plurality of sources may be provided as shown in FIG. 7A. Total vulnerabilities may be determined based on the total assets obtained during the scanning. If one asset is determined to be attackable or in a hostile condition that the user is not expecting, it is determined that a vulnerability exists associated with such asset. FIG. 7B illustrate another example of workspace details.

In some examples, a value of total vulnerabilities may be provided as part of the vulnerability report 102. When the value of total vulnerabilities is higher than a first threshold value, the vulnerable level may be determined high which also means that the user's assets are more attackable. When the value of total vulnerabilities is less than the first threshold value and higher than a second threshold, the vulnerable level may be determined medium. When the value of total vulnerabilities is less than the second threshold, the vulnerable level may be determined low.

In some examples, as shown in FIG. 2, when the user inputs a domain name and an inaccessible URL is obtained as the output data 103, change of the connection origin may be performed to further monitor whether such a URL is accessible. If after the change of the connection origin, the URL is accessible and contains assets relevant to the user, such assets may be determined vulnerable. For example, when an inaccessible URL can be relocated to the user's webpage by changing the connection origin, it may be determined that there is a vulnerability associated with such URL.

Figure 8:
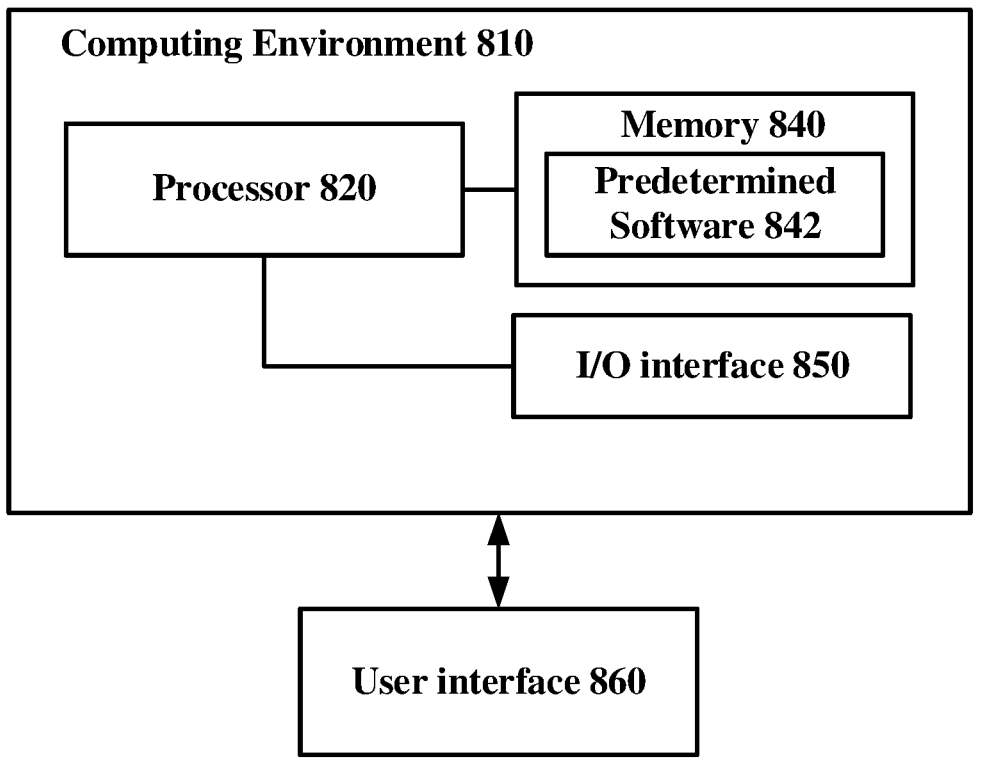
FIG. 8 is a diagram illustrating a computing environment coupled with a user interface, according to an example of the present disclosure.

FIG. 8 shows a computing environment (or a computing device) 810 coupled with a user interface 860. The computing environment 810 can be part of a data processing server. In some embodiments, the computing device 810 can perform any of various methods or processes (such as data scanning or searching) as described hereinbefore in accordance with various examples of the present disclosure. The computing environment 810 may include a processor 820, a memory 840, and an I/O interface 850.

The processor 820 typically controls overall operations of the computing environment 810, such as the operations associated with the display, data acquisition, data communications, and image processing. The processor 820 may include one or more processors to execute instructions to perform all or some of the steps in the above-described methods. Moreover, the processor 820 may include one or more modules that facilitate the interaction between the processor 820 and other components. The processor may be a Central Processing Unit (CPU), a microprocessor, a single chip machine, a GPU, or the like.

The memory 840 is configured to store various types of data to support the operation of the computing environment 810. Memory 840 may include predetermine software 842. Examples of such data include instructions for any applications or methods operated on the computing environment 810, video datasets, image data, etc. The memory 840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 850 provides an interface between the processor 820 and peripheral interface modules, such as a keyboard, a click wheel, buttons, and the like. The buttons may include but are not limited to, a home button, a start scan button, and a stop scan button.

In some embodiments, there is also provided a non-transitory computer-readable storage medium including a plurality of programs, such as included in the memory 840, executable by the processor 820 in the computing environment 810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method.

In some embodiments, the computing environment 810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for obtaining target data items from a target application to determine vulnerabilities of the target application, comprising:

obtaining, by a server of a monitoring system and according to an input data corresponding to at least one first category, a plurality of first data items from the target application and storing the plurality of first data items in one or more storages, wherein the plurality of first data items correspond to at least one second category;

analyzing, by a relevancy determinator in the monitoring system, the plurality of first data items to obtain one or more relevancies for the plurality of first data items, wherein the one or more relevancies are associated with the input data;

in response to determining that the one or more relevancies satisfy a first condition, automatically scanning, by a scanning engine in the monitoring system and according to the plurality of first data items, the target application at first pre-determined times to obtain a plurality of first target data items associated with the input data, wherein the plurality of first target data items correspond to the at least one second category;

in response to determining that the one or more relevancies satisfy a second condition, selecting one or more second data items from the plurality of first data items, and scanning, by the scanning engine and according to the one or more second data items, the target application at second pre-determined times to obtain a plurality of second target data items associated with the input data;

obtaining, by the monitoring system, a plurality of target data items associated with the target application, wherein the plurality of target data items comprise the plurality of first target data items and the plurality of second target items; and determining, by the monitoring system, whether the target application is vulnerable based on the plurality of target data items that are obtained.

2. The method of claim 1, wherein determining whether the target application is vulnerable based on the plurality of target data items that are obtained comprises:

determining a vulnerability based on the plurality of target data items; and determining whether the target application is vulnerable by comparing the vulnerability and a predetermined vulnerability threshold.

3. The method of claim 2, wherein determining the vulnerability based on the plurality of target data items comprises:

in response to determining that the plurality of target data items have a greater number than a predetermined target data threshold, determining that the vulnerability is greater than the predetermined vulnerability threshold and determining that the target application is vulnerable; and in response to determining that the plurality of target data items have a less number than the predetermined target data threshold, determining that the vulnerability is less than the predetermined vulnerability threshold and determining that the target application is not vulnerable.

4. The method of claim 1, wherein the at least one first category have no more categories than the at least one first category.

5. The method of claim 1, wherein the at least one second category comprises at least one category that is different from the at least one first category.

6. The method of claim 1, further comprising:

using a machine learning system to determine the one or more relevancies.

7. The method of claim 1, further comprising:

storing the plurality of first data items and the plurality of second target data in a data repository.

8. A device, comprising:

one or more processors;

a non-transitory storage coupled to the one or more processors; and a plurality of programs stored in the non-transitory storage that, when executed by the one or more processors, cause the device to perform acts comprising:

obtaining, according to an input data corresponding to at least one first category, a plurality of first data items from a target application, wherein the plurality of first data items correspond to at least one second category;

analyzing the plurality of first data items to obtain one or more relevancies for the plurality of first data items, wherein the one or more relevancies are associated with the input data;

in response to determining that the one or more relevancies satisfy a first condition, automatically scanning, according to the plurality of first data items, the target application at first pre-determined times to obtain a plurality of first target data items associated with the input data, wherein the plurality of first target data items correspond to the at least one second category;

in response to determining that the one or more relevancies satisfy a second condition, selecting one or more second data items from the plurality of first data items, and scanning, according to the one or more second data items, the target application at second pre-determined times to obtain a plurality of second target data items associated with the input data;

obtaining a plurality of target data items associated with the target application, wherein the plurality of target data items comprise the plurality of first target data items and the plurality of second target items; and determining whether the target application is vulnerable based on the plurality of target data items that are obtained.

9. The device according to claim 8, wherein determining whether the target application is vulnerable based on the plurality of target data items that are obtained comprises:

determining a vulnerability based on the plurality of target data items; and determining whether the target application is vulnerable by comparing the vulnerability and a predetermined vulnerability threshold.

10. The device of claim 9, wherein determining the vulnerability based on the plurality of target data items comprises:

in response to determining that the plurality of target data items have a greater number than a predetermined target data threshold, determining that the vulnerability is greater than the predetermined vulnerability threshold and determining that the target application is vulnerable; and in response to determining that the plurality of target data items have a less number than the predetermined target data threshold, determining that the vulnerability is less than the predetermined vulnerability threshold and determining that the target application is not vulnerable.

11. The device of claim 8, wherein the at least one first category have no more categories than the at least one first category.

12. The device of claim 8, wherein the at least one second category comprises at least one category that is different from the at least one first category.

13. The device of claim 8, wherein the plurality of programs cause the device to perform acts further comprising:

using a machine learning system to determine the one or more relevancies.

14. The device of claim 8, wherein the plurality of programs cause the device to perform acts further comprising:

storing the plurality of first data items and the plurality of second target data in a data repository.

15. A non-transitory computer readable storage medium storing a plurality of programs for execution by a device having one or more processors, wherein the plurality of programs, when executed by the one or more processors, cause the device to perform acts comprising:

obtaining, according to an input data corresponding to at least one first category, a plurality of first data items from a target application, wherein the plurality of first data items correspond to at least one second category;

analyzing the plurality of first data items to obtain one or more relevancies for the plurality of first data items, wherein the one or more relevancies are associated with the input data;

in response to determining that the one or more relevancies satisfy a first condition, automatically scanning, according to the plurality of first data items, the target application at first pre-determined times to obtain a plurality of first target data items associated with the input data, wherein the plurality of first target data items correspond to the at least one second category;

in response to determining that the one or more relevancies satisfy a second condition, selecting one or more second data items from the plurality of first data items, and scanning, according to the one or more second data items, the target application at second pre-determined times to obtain a plurality of second target data items associated with the input data;

obtaining a plurality of target data items associated with the target application, wherein the plurality of target data items comprise the plurality of first target data items and the plurality of second target items; and determining whether the target application is vulnerable based on the plurality of target data items that are obtained.

16. The non-transitory computer readable storage medium of claim 15, wherein determining whether the target application is vulnerable based on the plurality of target data items that are obtained comprises:

determining a vulnerability based on the plurality of target data items; and determining whether the target application is vulnerable by comparing the vulnerability and a predetermined vulnerability threshold.

17. The non-transitory computer readable storage medium of claim 16, wherein determining the vulnerability based on the plurality of target data items comprises:

in response to determining that the plurality of target data items have a greater number than a predetermined target data threshold, determining that the vulnerability is greater than the predetermined vulnerability threshold and determining that the target application is vulnerable; and in response to determining that the plurality of target data items have a less number than the predetermined target data threshold, determining that the vulnerability is less than the predetermined vulnerability threshold and determining that the target application is not vulnerable.

18. The non-transitory computer readable storage medium of claim 15, wherein the at least one first category have no more categories than the at least one first category.

19. The non-transitory computer readable storage medium of claim 15, wherein the at least one second category comprises at least one category that is different from the at least one first category.

20. The non-transitory computer readable storage medium of claim 15, wherein the plurality of programs cause the device to perform acts further comprising:

using a machine learning system to determine the one or more relevancies.

* * * * *